United States Patent [19]
Smith et al.

[11] Patent Number: 5,931,192
[45] Date of Patent: Aug. 3, 1999

[54] EXTERNAL UNIFIED INTEGRAL BLEED SYSTEM FOR VALVES

[75] Inventors: Gordon M. Smith, Brookshire; Kevin W. Lilie, Columbus, both of Tex.

[73] Assignee: Johnston Pump/General Valve Inc., Brookshire, Tex.

[21] Appl. No.: 08/695,677

[22] Filed: Jul. 22, 1996

[51] Int. Cl.⁶ .................................................. F16K 11/18
[52] U.S. Cl. .................................... 137/599; 137/597
[58] Field of Search .......................... 137/599, 597, 137/884

[56] References Cited

U.S. PATENT DOCUMENTS

| | | | |
|---|---|---|---|
| 3,135,284 | 6/1964 | Magos | 137/599 X |
| 4,193,420 | 3/1980 | Hewson | 137/597 X |
| 4,879,912 | 11/1989 | Suckow | 137/597 X |
| 5,277,224 | 1/1994 | Hutton et al. | 137/597 |
| 5,392,813 | 2/1995 | Smith et al. | 137/599 |

*Primary Examiner*—Stephen M. Hepperle
*Attorney, Agent, or Firm*—Leonard Tachner

[57] ABSTRACT

A unified block integral bleed system for use with valves such as plug-type valves wherein pressure release flow occurs through a manifold port mounting arrangement which accesses upstream, downstream and body cavity portions of the valve and provides atmosphere taps as well without external piping. Such a manifold integral body bleed system provides internal flow channels and is preferably configured as a separate external unit which can be retrofitted to existing valve installations in the field. The manifold bleed system may be attached to the valve, such as by welding, or may be located at a position remote from the valve.

11 Claims, 9 Drawing Sheets

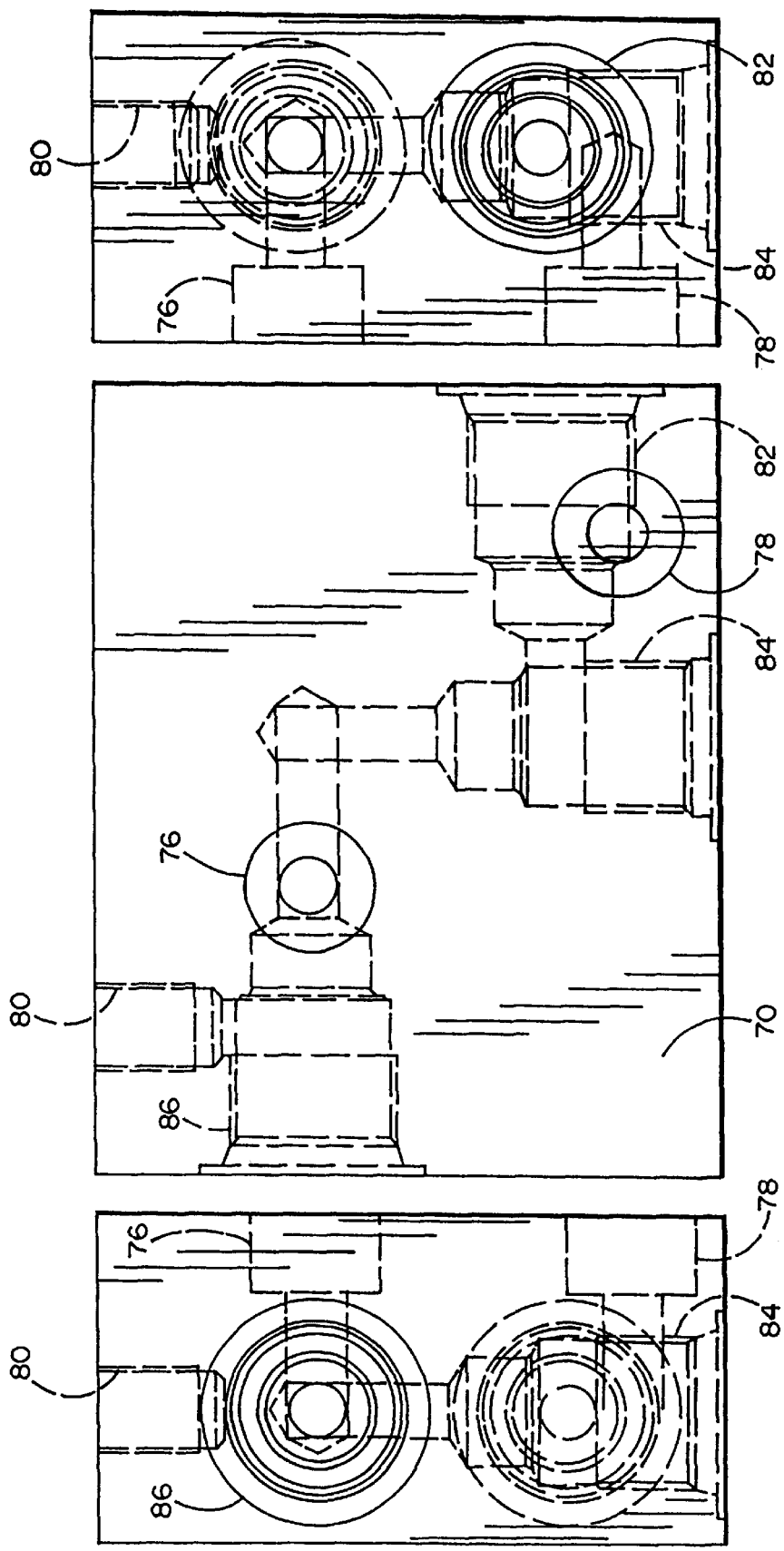

EXTERNAL UNIFIED INTEGRAL BLEED SYSTEM FOR VALVES

BACKGROUND OF THE INVENTION

1. Field of the Invention

The present invention relates generally to valves of the type which may be used to regulate the flow of fluids therethrough and more specifically, to an external integral bleed system for such valves for permitting the selective release of pressure.

2. Prior Art

The design of many valves in the prior art permits pressure trapped in the body cavity to be relieved by means of pressure relieving devices. Such devices are designed to permit hydraulic communication of the fluid trapped in the body cavity to the upstream, downstream or external area of the valve body. At first glance this appears to be a relatively simple task, but upon further analysis it will be seen that this task is indeed quite overwhelmingly complex. As a result, prior art solutions have also been complex as well as clumsy and potentially dangerous. The complexity of the use of external pressure relieving devices stems primarily from the large array of variations that must be provided in a conventional bleed system and the number of parameters which can affect the nature of the bleed system in prior art valves. For example, the material of which the bleed systems are made will usually depend upon the nature of the media. Thus for example there may be two basic materials depending upon whether the media is caustic or not caustic. Material properties of external valve bleed systems will also vary as a result of differences in the temperature of the media and the viscosity of the media. There will also be variations in the geometry of end connections such as whether such connections are threaded or compression fittings, or pipe threads or unions and the like. Another significant variable is size. Variations in the bleed system configuration will depend upon the size of the pipes and tubes and the pipe schedules and the thicknesses of the tubes and the pipes. Other variations stem from variations in the manufacturer's specifications for valves. The sealing material will also result in variations necessary in the pressure relieving devices of the bleed system. Different relief valve requirements are also parameters which affect the complexity of such bleed systems. Check valve crack pressures also affect variations and manual valve styles with and without locking devices add additional parametric permutations. These variations quickly add up. Just those mentioned above represent over one million possible permutations. As a result, a large part of inventory control, purchasing, designing and design control for valve manufacturers can be directly attributed to the relatively secondary issue of the bleed system.

Prior art pressure-relieving bleed systems are clumsy because once they are installed they require numerous joints which can leak. In addition, the bleed system normally protrudes from the valve body and as a result, handling and shipping becomes more difficult. Once installed, the bleed system with its required maintenance access area, virtually doubles the original valve installation dimensional requirements. The dangers of an external pressure relieving bleed system of the prior art stem from the fact that once the valve is installed, the relatively weak structure of the bleed system is attached to an immobilized valve and provides protruding plumbing and valves such as relief valves and the like. Such protrusions can easily be broken off creating significant dangers. A bleed system that becomes severed can create the possibility of a catastrophic failure including fire, explosion, hazardous material spills and the like.

An improved valve pressure-relieving bleed system which overcomes the aforementioned disadvantages of prior art bleed systems is disclosed in U.S. Pat. No. 5,392,813 to Smith et al. The invention disclosed therein comprises a manifold bleed system which may be configured as the bonnet or lower plate of the valve body. Unfortunately, such an intimate configuration is not conductive to field retrofit of existing valve installations, thus making the significant improvements available only on newly fabricated valves. There is therefore, a need to provide a manifold configuration which is adapted for retrofitting existing valve installations to provide an improved bleed system for valves already in service.

SUMMARY OF THE INVENTION

The present invention meets the aforementioned need by providing an integral bleed system for valves. The integral bleed system of the present invention is implemented in its preferred embodiment by means of a manifold and cartridge components which are used instead of pipes, tees and elbows for routing fluid and using inline components for control. The principal novelty of the present invention resides in the incorporation of various bleed system hydraulic circuits into a unified manifold block which is configured as an external integral unit that is structurally independent of the valve itself. Furthermore, in the present invention, in order to communicate with the three media process pressures, the invention utilizes a manifold port mounting arrangement to access upstream, downstream and body cavity regions of the valve without the use of external piping and taps. As a result, the present invention is significantly less complex and more compact as compared to prior art bleed systems and valves. The variability of parts and configurations and materials previously referred to is greatly reduced along with the number of permutations that must otherwise be part of the inventory of a valve manufacturer. The probability of leaks in the bleed system is greatly reduced. Material management by the valve manufacturer and inventory by the valve manufacturer are also both reduced significantly. The resulting valve, including its integral bleed system is significantly easier to handle and ship and certainly easier to install. It requires less room when installed. The likelihood of damage to the system as a result of external plumbing around the exterior of the valve is greatly reduced. The probability of mishandling in the field is minimized. Fire safety is improved, fluid handling is safer and the chances of catastrophic failures of the type previously described are significantly minimized. Most significantly, the present invention may be retrofitted to existing installations of valves thus permitting attainment of all of the aforementioned advantages in valves already in the field.

OBJECTS OF THE INVENTION

It is therefore a principal object of the present invention to provide an improved bleed system for valves, the bleed system of the present invention comprising an integral component independent of the structure of the valve itself.

It is an additional object of the present invention to provide an integral bleed system for valves in which there are no external plumbing requirements such as found in conventional bleed systems for fluid handling valves.

It is still an additional object of the present invention to provide an integral bleed system for valves in which the bleed system functions as a manifold for relieving pressure by selective flow of fluid media between the valve body cavity and upstream or downstream throats or the external environment.

It is still an additional object of the present invention to provide a standardized manifold integrated bleed system for valves in which pressure relieving flow may be selectively provided in such a valve in a variety of alternative ways simply by installing flow control devices such as relief valves, shut-off valves and the like as well as plugs and caps for configuring such a standard manifold into the selected flow configuration.

BRIEF DESCRIPTION OF THE DRAWINGS

The aforementioned objects and advantages of the present invention as well as additional objects and advantages thereof will be more fully understood hereinafter as a result of the detailed description of a preferred embodiment when taken in conjunction with the following drawings in which:

FIG. 4 comprising

FIGS. 7–11 illustrate various elevational views of the manifold integral bleed system of the present invention shown mechanically configured in accordance with a preferred embodiment thereof;

DETAILED DESCRIPTION OF A PREFERRED EMBODIMENT

Figure 1:
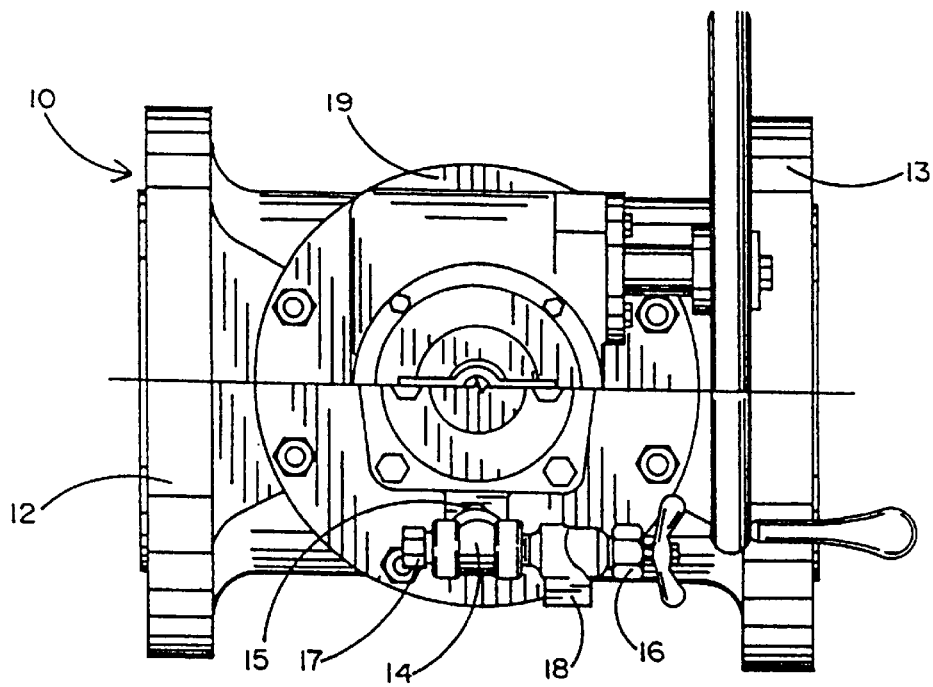
FIG. 1 is a prior art illustration of an external bleed system installed on a valve for allowing the release of pressure from the center cavity of the valve to atmosphere.

The relative advantages of the present invention may be best understood by first referring to FIGS. 1–4 which illustrate various prior art bleed systems connected to valves for pressure relieving purposes. By way of example, FIG. 1 illustrates a manual bleed discharge-to-atmosphere in a valve 10 having inlet port 12 and outlet port 13 and a central body cavity 19. As seen in FIG. 1 a manual bleed discharge system utilizes a tee 14 connected to the central cavity 19 by means of a nipple 15. The tee has a pipe plug 17 connected at one end and a bleed valve 18 connected at the other. A manual valve shut-off 16 is provided to facilitate opening and closing valve 18. The configuration of FIG. 1 allows the discharge of pressure from the central cavity to atmosphere.

Figure 2:
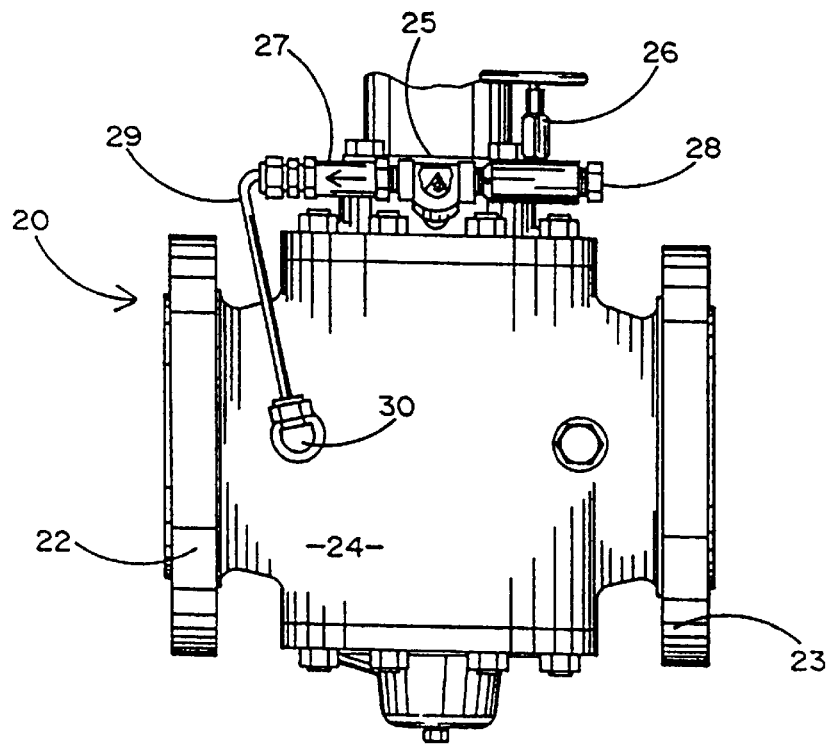
FIG. 2 is a prior art illustration of an external bleed system used in a valve to relieve pressure from the center cavity of the valve to the upstream area of the valve body.

The prior art bleed system of FIG. 2 is one which allows the relief of pressure in the central cavity of a valve 20 to the upstream throat side of the valve. More specifically as seen in FIG. 2, valve 20 is provided with an upstream flange 22 and a downstream flange 23, both extending axially from a central body cavity 24. In order to permit the relief of pressure within the central cavity to the upstream side of the valve, valve 20 is provided with a bleed system including a tee 25 one end of which is provided with a manual valve 26 and a pipe plug 28. The other end of tee 25 is connected to a relief valve 27 which is connected by tubing 29 to a check valve 30 which is, in turn, connected to a port through the upstream throat end of valve 20.

Figure 3:
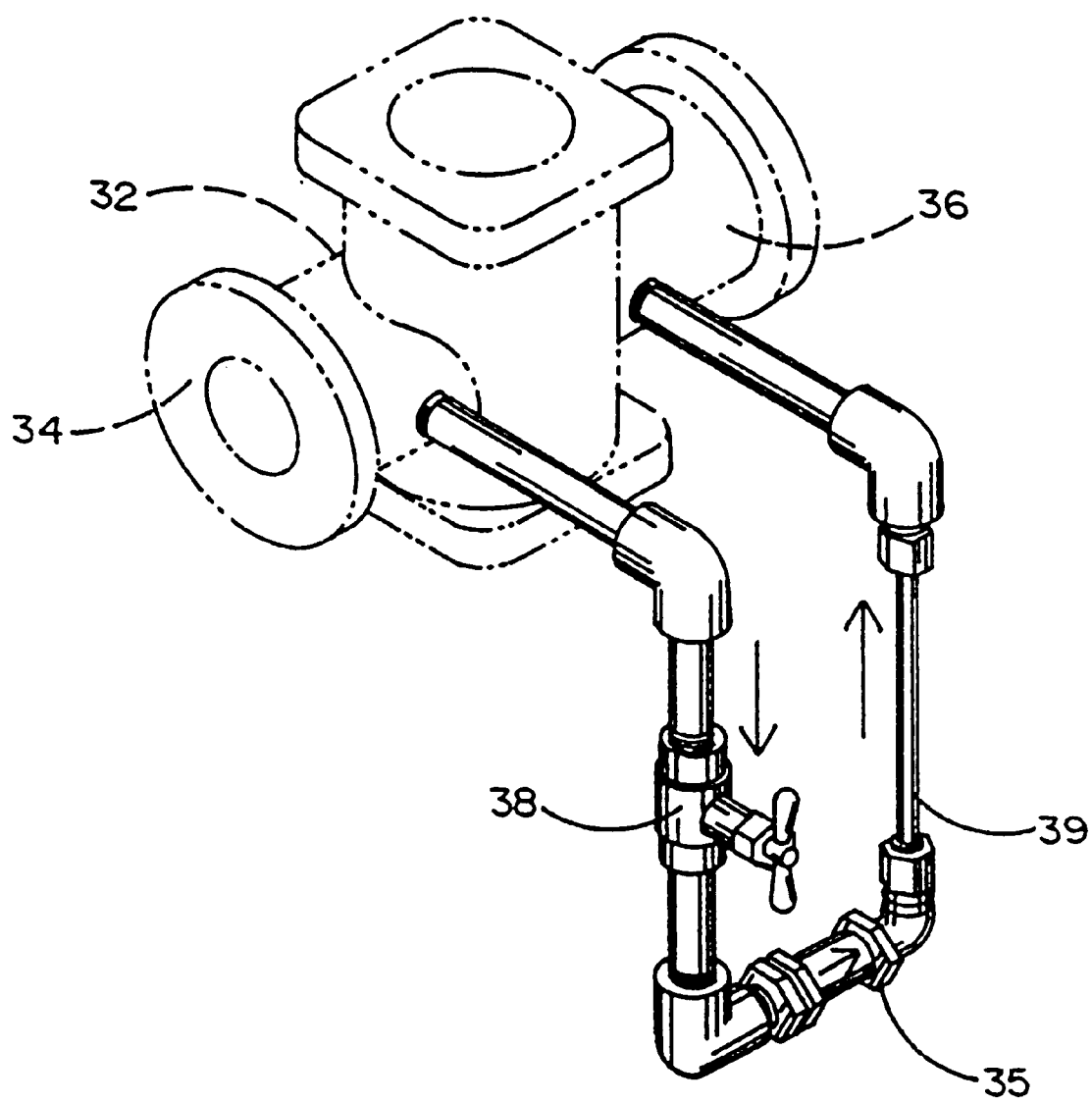
FIG. 3 is a prior art illustration of an external bleed system used in a valve to provide pressure relieving flow between the upstream and downstream areas of a valve.

FIG. 3 illustrates a relief system comprising an external bleed or bypass configuration for allowing selective flow from the upstream side of a valve 32 to the downstream side of that valve. More specifically, as seen in FIG. 3 valve 32 has an upstream throat 34 and a downstream throat 36. The upstream throat is connected by means of suitable piping to a manual valve 38 which is, in turn, connected by appropriately configured piping interface to a relief valve 35. Relief valve 35 is, in turn, connected by suitable tubes to the upstream throat. Thus the configuration of FIG. 3 permits the relief of pressure from the upstream side of valve 32 through the downstream side by opening and closing manual valve 38.

Figure 4A:
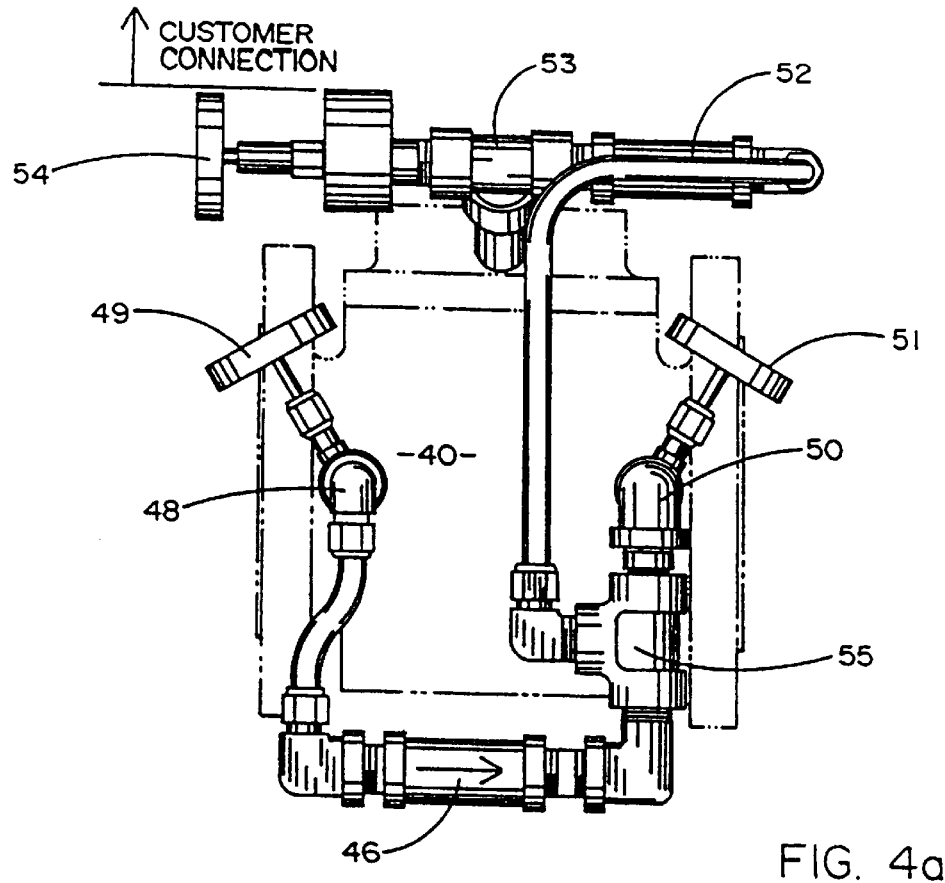
FIGS. 4a and 4b, is a prior art illustration of an external bleed system in a valve wherein pressure is relieved by permitting regulated flow between the center cavity of the valve and the upstream area of the valve as well as between the upstream area of the valve and the downstream area of the valve.
Figure 4B:
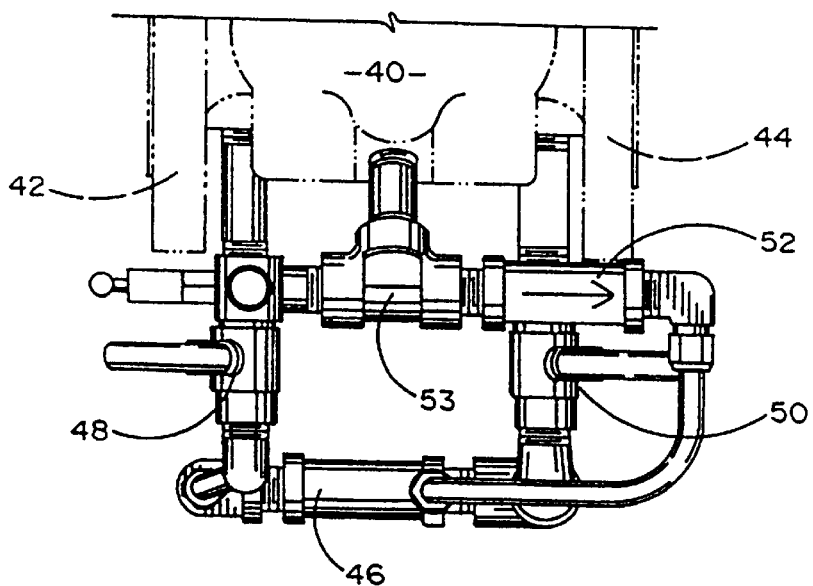

FIG. 4, comprising FIGS. 4a and 4b, is again a prior art illustration of a bleed system used in conjunction with a conventional valve. In the particular configuration shown in FIG. 4, the bleed system permits both center cavity to upstream pressure relief as well as downstream-to-upstream pressure relief. Both use a relatively complicated arrangement of external piping and plumbing to accomplish that purpose. As shown in FIGS. 4a and 4b, the valve 40 is provided with a downstream flange 42 and an upstream flange 44. The bleed system interfaces with the valve 40 at three discrete positions, namely, the upstream throat, the downstream throat and the central cavity of the valve 40. The downstream connection is provided with a manual valve 48 which is, in turn, connected to a check valve or relief valve 46 which is, in turn, connected to a manual valve 50. Manual valves 48 and 50 provide actuators 49 and 51 to selectively open and close those two valves. The central cavity connection of the bleed system of FIG. 4 is connected to a tee 53, one end of which is connected to a manual valve suitable for opening and closing to permit selective flow to a customer-provided connection which may for example be used for sensor purposes. The other end of tee 53 is connected to a check valve 52 which is, in turn, connected through suitable tubing to a tee 55 which interfaces with upstream manual valve 50.

Each of the various bleed system configurations of FIGS. 1–4 provides different types of pressure relief flow for different applications depending upon the source of the pressure within the valve and the location of the exit port of the bleed system. One can readily see in FIGS. 1–4 that the required plumbing to achieve these various bleed system configurations is quite complex and cumbersome and adds numerous sources of leaks and catastrophic accident to the valves to which those bleed systems are connected.

Furthermore, one can readily perceive the large number of differently shaped fittings for pipes and tubes that are required to permit the bleed system plumbing to be configured in just those four exemplary illustrations of FIGS. 1–4. Thus one can readily understand that a bleed system invention which obviates all of the external plumbing shown in FIGS. 1–4 as well as complicated and cumbersome externally-installed plumbing that would be need for other similar configurations would be highly desireable. Such a bleed system would lead to significant savings as well as to a reduction in the danger of a catastrophic accident that could result from the cumbersome external configuration of such prior art bleed systems of FIGS. 1–4, as well as others.

Figure 6:
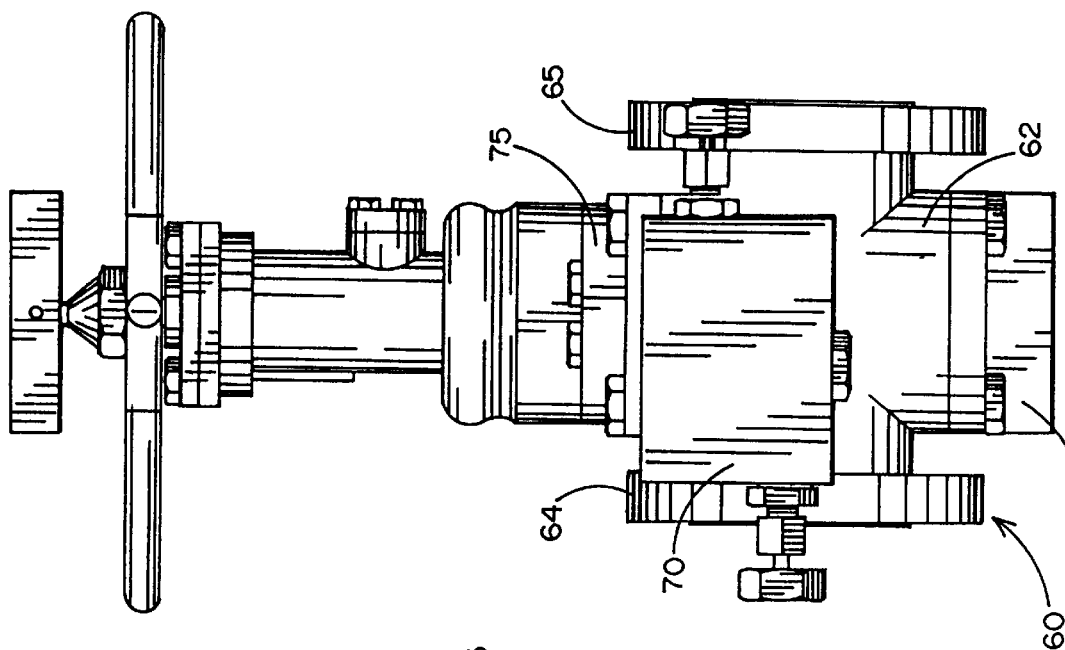
FIG. 6 is a front view of the valve and bleed system shown in FIG. 5.
Figure 5:
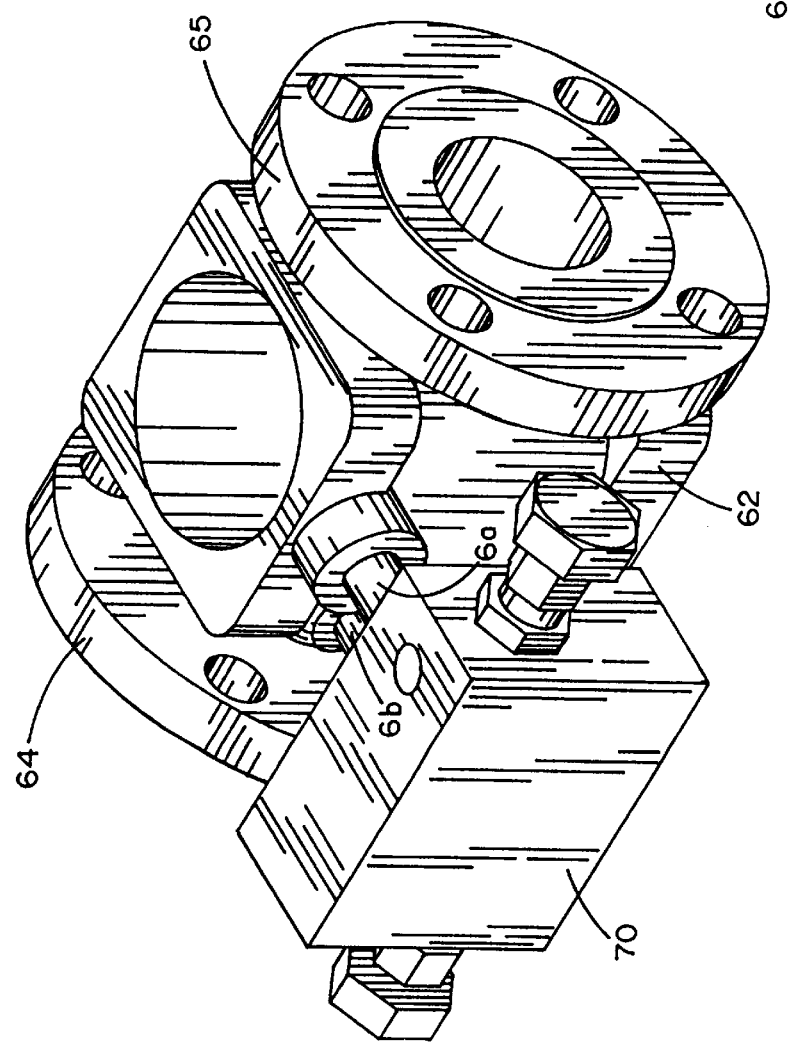
FIG. 5 is a three-dimensional view of a plug-type valve having an external unified bleed system of the present invention installed.
Figure 10:
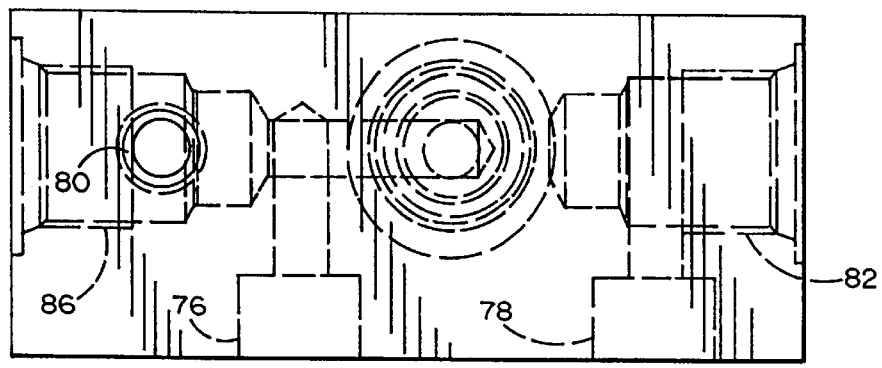
Figure 11:
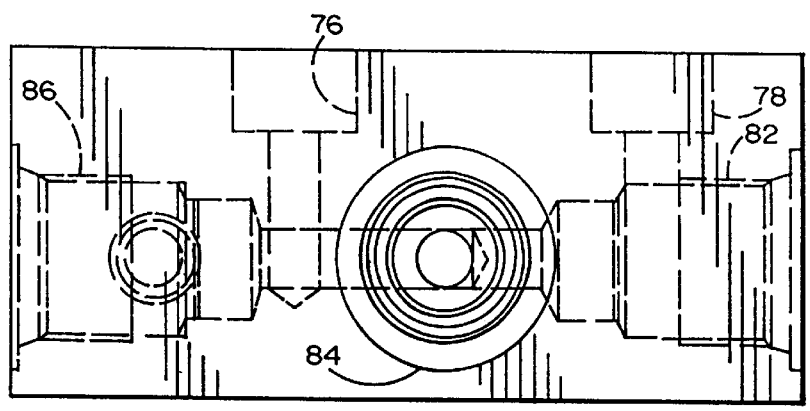

The present invention overcomes the aforementioned disadvantages by providing an integral bleed system which may be understood initially by referring to FIGS. 5 and 6. FIGS. 5 and 6 illustrate an exemplary valve 60 which is of a plug-type configuration and comprises input and output flanges 64 and 65, respectively. A valve body 62 is configured with a plug (not shown), the rotational position of which determines whether or not the valve is opened. The bottom of valve 60 is provided with a lower plate 68. Lower plate 68 is adapted to receive a trunnion (not shown) connected integrally to the plug. The trunnion extends through an upper plate or bonnet 75. Bonnet 75 is the upper sealing plate for the valve body. The valve 60 also comprises a separate rectangularly-shaped metal block 70 that comprises an internal manifold with various externally accessible ports. These ports may be plugged or capped or provided with suitable devices to configure a bleed system in which pressure relief may be accomplished in a variety of different ways as will be seen hereinafter in more detail.

Figure 12:
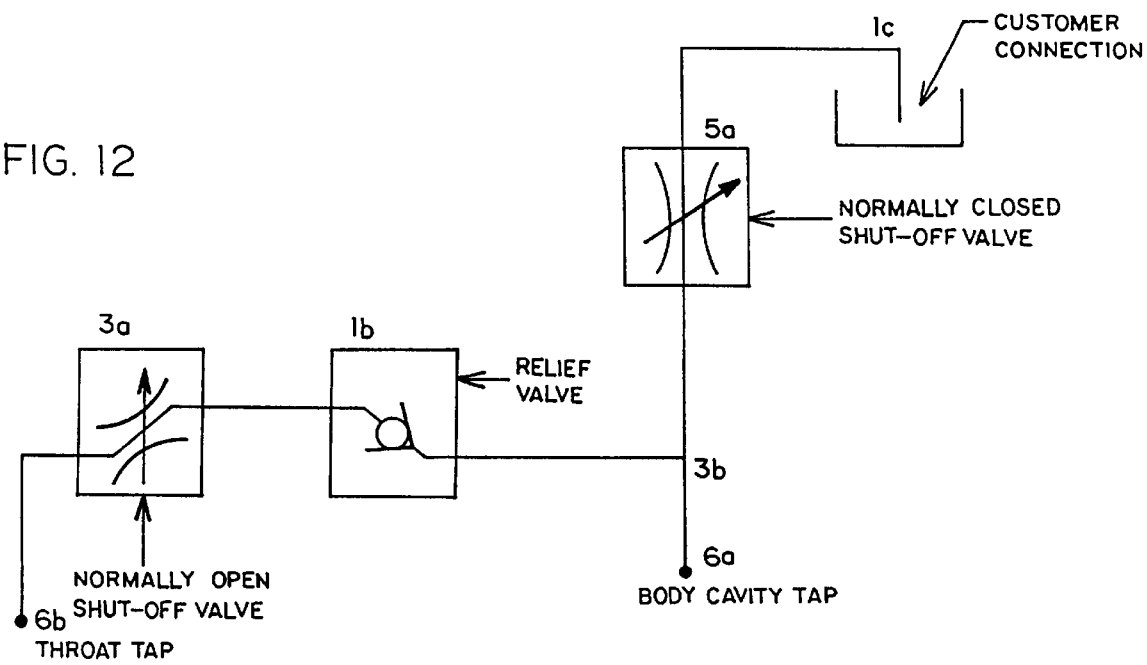
FIG. 12 is a schematic illustration of the standardized integral bleed system configuration of the preferred embodiment of the invention ready to be adapted to a variety of different configurations for pressure relieving flow.
Figure 15:
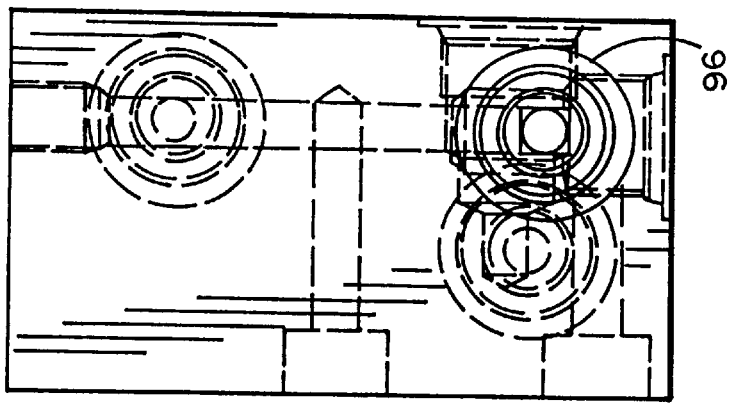
FIGS. 13–17 illustrate various elevational views of the manifold integral bleed system of the present invention shown mechanically configured in accordance with another embodiment thereof.
Figure 13:
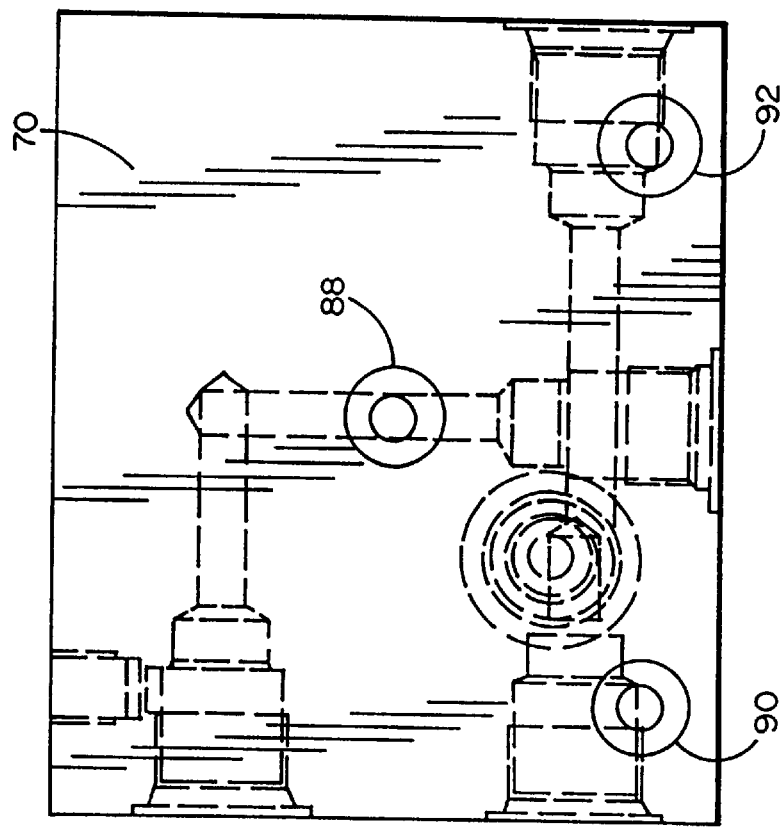
Figure 14:
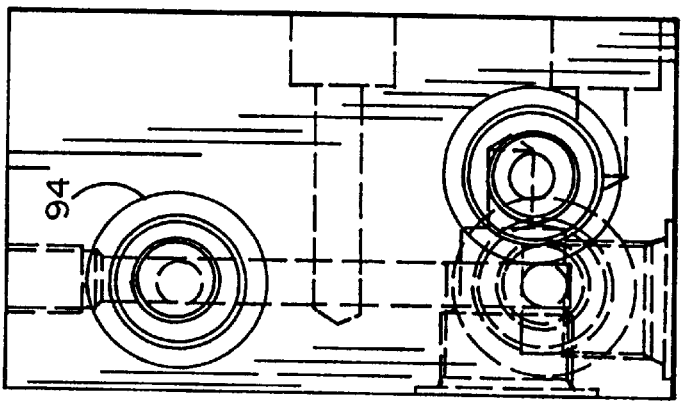
Figure 16:
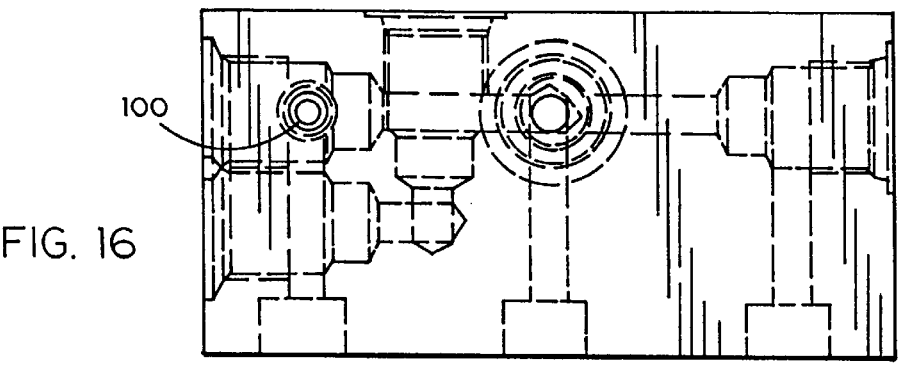
Figure 17:
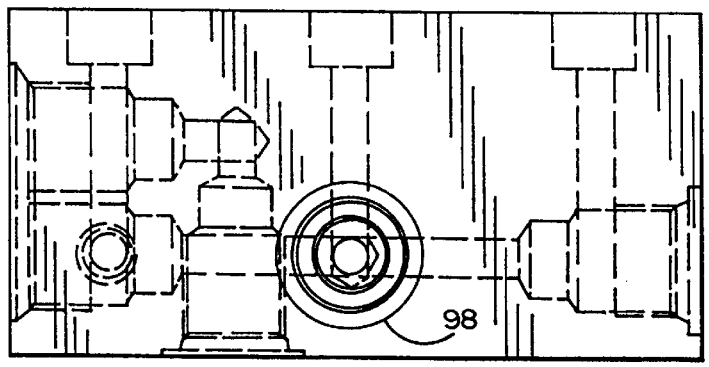

The manifold flow configuration of the integral bleed system block 70 of FIGS. 5 and 6 is shown mechanically in FIGS. 7–11 and schematically in FIG. 12. As seen in FIG. 12, integral bleed system 70 is provided with a body cavity tap 6a and a throat tap 6b. These two taps are apertures in a surface of the integral bleed system. The various square boxes shown in FIG. 12 represent externally accessible ports which may be either capped or plugged or provided with a device such as a shut-off valve or a relief valve for configuring the manifold to provide pressure relief from a desired source to a desired drain as will be seen hereinafter. The straight lines between the various square boxes and the various taps shown in FIG. 12 represent flow channels which are provided internally within the integral body bleed system 70 of the present invention. Depending upon the desired bleed system configuration, some of the flow channels of the schematic of FIG. 12 receive fluid from a pressure source to delivery to a pressure drain and some of such flow channels are capped (not used) in various applications.

The mechanical aspects of manifold 70 configured for the schematic of FIG. 12, are illustrated in FIGS. 7–11. As shown therein, manifold 70 comprises a valve body port (In) 76, a valve conduit port (Out-Upstream) 78, a bleed port 80, a manual bleed valve port 82, a relief valve port 84 and an isolation valve port 86. The flow relationships between the various ports may be readily observed in FIGS. 7–11 which comprise elevational, left side, right side, top and bottom views of manifold 70, respectively.

Figure 18:
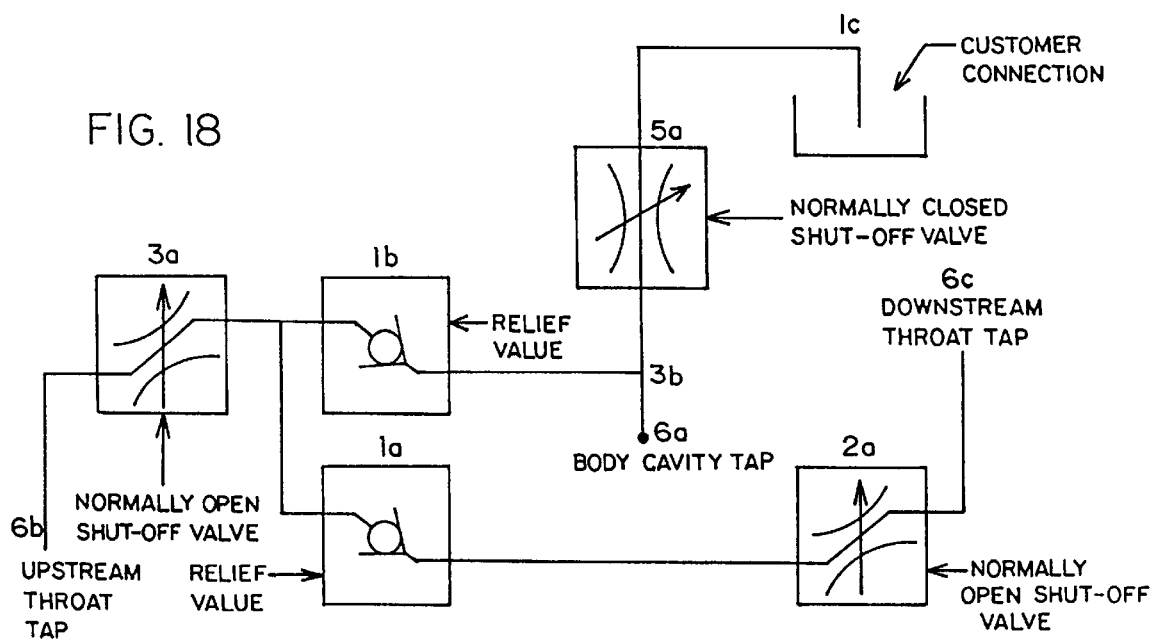
FIG. 18 is a schematic diagram similar to that of FIG. 12, but showing the standardized manifold configuration of the present invention configured for flow relief in a first alternative configuration.

In FIG. 18 relief valves are provided at port 1a and port 1b and a normally open shut-off valve is provided at port 3a, thus interconnecting body cavity tap 6a with throat tap 6b. In addition, a normally closed shut-off valve is provided at port 5a which is connected to a customer connection port 1c. A normally open shut-off valve is provided at port 2a which is connected to a downstream throat tap at port 6c. The remaining ports of the integral body bleed system of the invention are either capped or plugged and are thus not used in the configuration of FIG. 18. Thus the configuration of FIG. 18 provides a relief flow configuration which permits pressure built up in the valve body cavity or in the downstream throat to exit through an upstream throat tap. It also permits selective flow of the fluid within the body cavity of the valve to a customer connected sensor for example through a normally closed shut-off valve which can be opened manually.

The mechanical aspects of the manifold 70, configured for the schematic of FIG. 18, are shown in FIGS. 13–17. As shown therein, this embodiment of manifold 70 comprises a valve body port (In) 88, a valve conduit port (In-Downstream) 90, a valve conduit port (Out-Upstream) 92, a manual bleed valve port 94, an isolation valve port (Upstream) 96, a body relief valve port 98 and a bleed port 100. The flow relationships between the various ports may be readily observed in FIGS. 13–17 which comprise elevational, left side, right side, top and bottom views of manifold 70, respectively.

Figure 21:
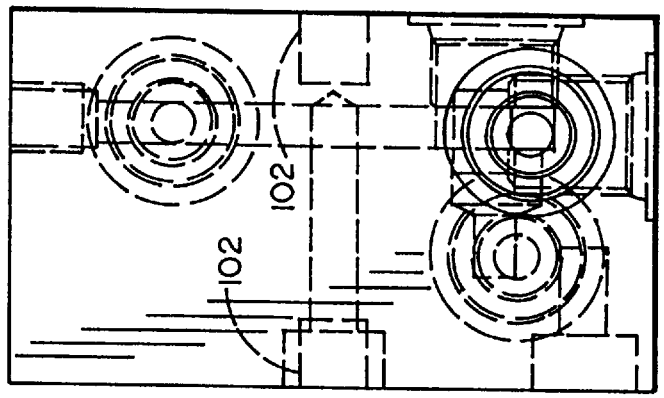
FIGS. 19–21 illustrate various elevational views of the manifold integral bleed system of the present invention shown mechanically configured in accordance with still another embodiment thereof.
Figure 19:
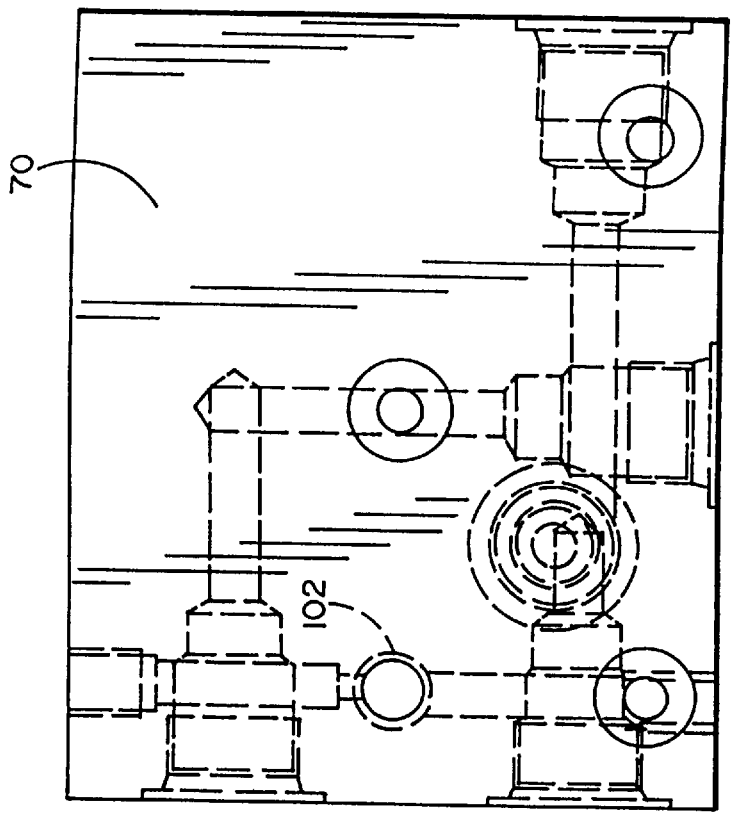
Figure 20:
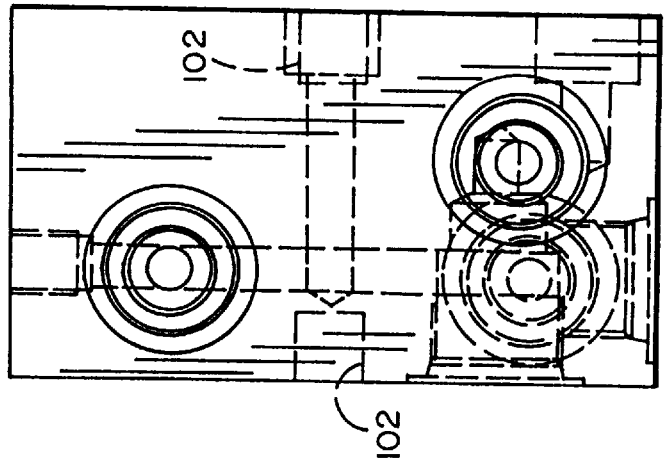

FIGS. 19–21 show an embodiment of the manifold 70 configured similarly to the embodiment of FIGS. 13–17 but with the addition of a sight glass feature to permit physical observation of the flow therein. More specifically, a sight-glass channel 102 is shown in FIGS. 19–21 as a modification of the views of manifold 70 shown in FIGS. 13–15.

Other configurations for the integral body bleed system 70 of the present invention are readily achieved. In each such case the direction of flow within the manifold 70 is a function of devices connected into the ports or apertures externally accessible along the various surfaces depicted in FIGS. 7–11.

It is to be noted that in all such exemplary configurations of integral body bleed system 70 as depicted for example in FIGS. 7–23, there are no external plumbing tubes, pipes, elbows, tees, etcetera, required to be installed in the integral body bleed system 70 or anywhere else in valve 60 for that matter. All pressure relief flow occurs within the integral body bleed manifold which has internal channels through which all such flow occurs. There is a significant reduction in hardware extending externally of the combination of valve 60 and integral bleed system 70. Such external extensions are limited to accessible manual valve controls as well as fractional portions of relief valves and other such devices which extend beyond the surface of the aperture into which they are connected. Consequently there is a significant reduction in the complexity of the bleed system configurations necessary to serve all consumer needs for pressure relief flow. There is thus a several order of magnitude reduction in inventory control and commensurate savings in purchasing, shipping and the like, which generates a reduction in overall cost. There is also a significant reduction in clumsy protrusions which otherwise interfere with handling and shipping and thus a significant improvement in maintenance access as well. Most importantly, there is a significant reduction in the danger of severing an external pipe or fitting or of breaking a protruding device that one encounters with prior art conventional bleed systems. Thus there is a significant reduction in the probability of a severed bleed system part which could otherwise result in catastrophic failure in the form of fire, explosion, hazardous material spills and the like.

It will now be understood that what has been disclosed herein comprises a unified block integral bleed system for use with valves such as plug-type valves wherein pressure release flow occurs through a manifold port mounting arrangement which accesses upstream, downstream and body cavity portions of the valve and provides atmosphere taps as well without external piping. Such a manifold integral body bleed system provides internal flow channels.

Those having skill in the art to which the present invention pertains will now, as a result of the applicants' teaching herein, perceive various modifications and additions which may be made to the invention. Such modifications can be perceived in the form of different generalized flow configurations from which selectively configured pressure release flow can be achieved by simply plugging or capping various orifices externally available to the user while installing various pressure relief flow devices in the others including manual valves and relief valves and the like. Accordingly, all such modifications and additions are deemed to be within the scope of the invention which is to be limited only by the claims appended hereto and their equivalents.

We claim:

1. In a fluid flow valve of the type having upstream and downstream throats and a central body cavity, an integral bleed system comprising:

a manifold block having a plurality of external surfaces and having a plurality of internal fluid flow channels and a plurality of externally accessible ports in fluid communication with respective flow channels; said ports being positioned on one of said external surfaces;

at least one flow control device positioned in one of said ports for affecting fluid flow in a corresponding flow channel; and a plurality of straight taps extending from said ports on said one external surface for connecting said manifold block to said valve for interfacing said flow channels to said throats and body cavity whereby to permit selective valve pressure release flow through said manifold block;

said manifold block and said valve comprising separately enclosed structures which may be installed at different times.

2. The integral bleed system recited in claim 1 wherein said ports are configured to provide valve pressure release flow from said central body cavity to said upstream throat.

3. The integral bleed system recited in claim 1 wherein said ports are configured to provide valve pressure release flow from said central body cavity to said downstream throat.

4. The integral bleed system recited in claim 1 wherein said ports are configured to provide valve pressure release flow from said downstream throat to said upstream throat.

5. The integral bleed system recited in claim 1 wherein said ports are configured to provide valve pressure release flow from said upstream throat to said downstream throat.

6. The integral bleed system recited in claim 1 wherein said ports are configured to provide valve pressure release flow from said central body cavity to the exterior of said valve.

7. The integral bleed system recited in claim 1 wherein said ports are configured to provide valve pressure release flow from said downstream throat to the exterior of said valve.

8. The integral bleed system recited in claim 1 wherein said ports are configured to provide valve pressure release flow from said upstream throat to the exterior of said valve.

9. The integral bleed system recited in claim 1 wherein said flow control device is a manual flow control shut-off valve.

10. The integral bleed system recited in claim 1 wherein said flow control device is a relief valve.

11. The integral bleed system recited in claim 1 further comprising a sight-glass channel for observation of fluid flow in said manifold block.

* * * * *